July 16, 1963 G. H. PETERSON 3,097,725
KINETIC ENERGY ABSORBER
Original Filed May 29, 1951
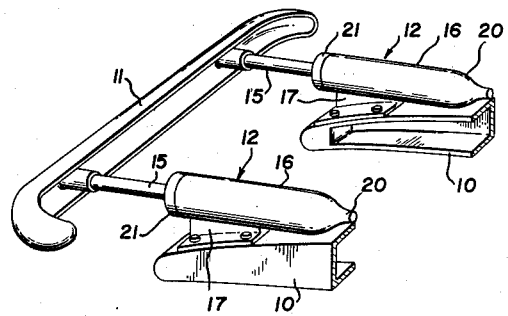
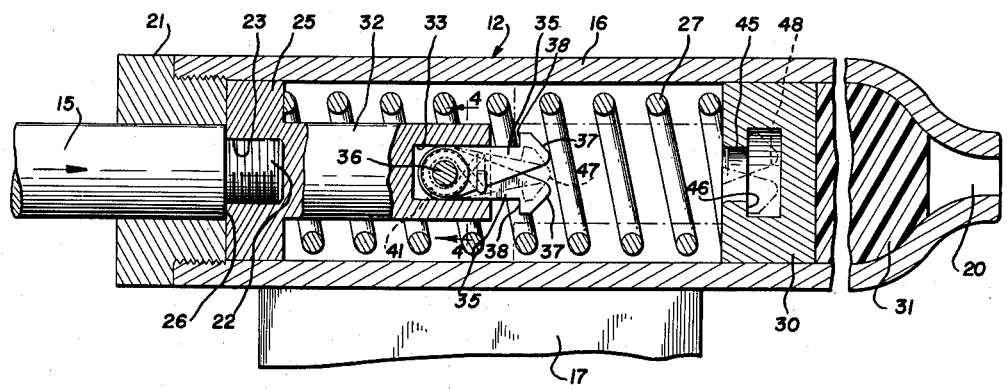
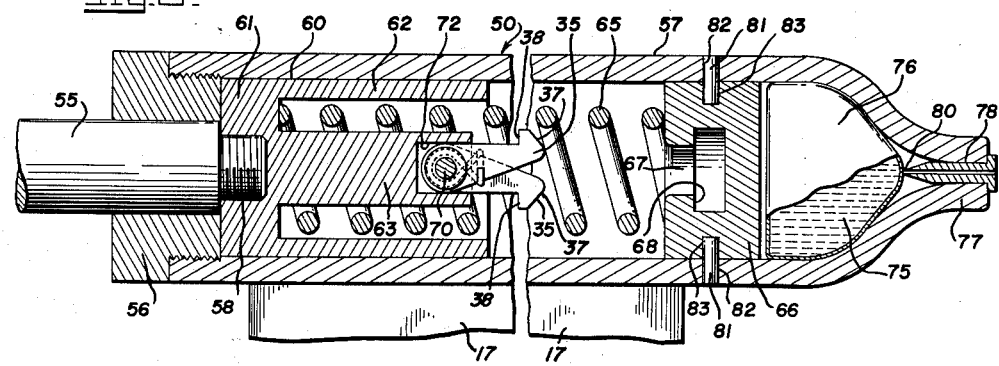
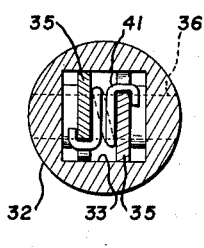
INVENTOR.
GERALD H. PETERSON
BY
*Gerald H. Peterson*
ATTORNEY

United States Patent Office 3,097,725
Patented July 16, 1963

3,097,725
KINETIC ENERGY ABSORBER
Gerald H. Peterson, Santa Monica, Calif.
(575 Tahquitz, Pacific Palisades, Calif.)
Original applications May 29, 1951, Ser. No. 228,847, and Oct. 22, 1956, Ser. No. 617,648. Divided and this application Sept. 2, 1959, Ser. No. 837,749
6 Claims. (Cl. 188—94)

This invention relates to a device for and method of absorbing kinetic energy, particularly for minimizing injury and damage by collisions and is directed to a safety device of this character for use on vehicles. While the principles involved are applicable to absorbtion of kinetic energy in general, the invention has special utility for use on automotive vehicles and will be so described herein for the purpose of disclosure and illustration.

Of the tremendous force released in the collision of two automobiles or the crash of an automobile against a stationary obstacle, a certain portion is absorbed by destruction and deformation of the vehicle structure and the rest of the impact force is converted into deceleration of the moving vehicle. Too often the deceleration is at a rate too extreme for passengers to survive without serious injury. In like manner, a stationary vehicle struck by a speeding vehicle may be accelerated to a degree fatal for the passengers.

The general object of the invention is to provide safety means for a vehicle that is capable of absorbing a sufficiently great proportion of such collision force to reduce the consequent acceleration or deceleration of the vehicle to a magnitude that can be endured by the vehicle occupants without injury, or at least without serious injury. A further object is to minimize the destructive deformation of the vehicle structure apart from the effect on the vehicle occupants.

These objects are accomplished by an energy-absorbing device in which two members are capable of moving relative to each other in two stages in response or reaction to an impact force. In the initial stage of reaction the impact force is directed against a suitable resilient means for conversion into potention energy. If the impact force is of minor magnitude, this potential energy is immediately released by recoil of the resilient means, and a feature of the invention is the fact that it will serve in this manner as an ordinary shock absorber for the vehicle. On the other hand, if the impact force is of excessive magnitude the relative movement of the two parts of the safety device passes into the second stage wherein the impact force is transformed into positive work by an extrusion action or special dashpot action. In the preferred practice of the invention, an automatic latch locks the resilient means against release or recoil whenever the impact force is great enough to force the relative movement of the two parts of the safety device into this second stage of reaction.

The two-stage operation of the device in reaction to an impact force spreads the impact force over an appreciable time period and thus reduces the magnitude of force that must be absorbed by the safety device at any one instant of time. The extension in time enables the safety device to absorb the major portion of the energy thereby to reduce to a safe magnitude the remaining unabsorbed portion of the impact force that is converted into acceleration or deceleration of the vehicle.

The various objects and advantages of the invention will be apparent from the following detailed description, taken with the accompanying drawings.

In the drawings, which are to be regarded as merely illustrative,

FIG. 1 is a perspective view of a preferred embodiment of the invention incorporating two energy-absorbing units mounted on one end of a vehicle frame;

FIG. 2 is an enlarged longitudinal sectional view of one of the energy-absorbing units shown in FIG 1;

FIG. 3 is a view similar to FIG. 2 showing a modified form of the energy-absorbing unit; and FIG. 4 is a sectional view taken along the lines 4—4 of FIG. 2.

In FIG. 1, the vehicle on which the preferred embodiment of the invention is mounted is represented by the end portions of two longitudinal frame members 10 of the vehicle chassis. This particular arrangement for minimizing the effects of a collision, comprises a bumper member 11 and two energy-absorbing units, each generally designated 12, interposed between the bumper member 11 and the vehicle chassis. The two energy-absorbing units 12 comprise two plungers 15 which cooperate to support the bumper 11 and further comprise two cylinders 16, which in turn movably carry the plungers 15. The two cylinders 16 are mounted on the two frame members 10, respectively, by suitable brackets or standards 17.

As best shown in FIG. 2, each of the cylinders 16 is of heavy metal to withstand high pressure and preferably at its rear end tapers to a discharge port or nozzle 20. The front end of each cylinder 16 may be closed by a suitable bushing 21 through which the corresponding plunger 15 slidingly extends for inward movement in response to impact forces. The inner end 22 of the plunger 15 is securely threaded into the axial bore 23 of a thrust member 25 and is of reduced diameter to form a rearwardly presented annular shoulder 26 for abutment against the face of the thrust member.

The thrust member 25 is slidingly mounted in the cylinder 16 and is normally held at the front end of the cylinder by the forward end of a suitable resilient means in the form of a heavy helical spring 27, which spring is confined, preferably under substantial compression, between the thrust member 25 and a suitable piston 30.

The interior of the cylinder 16 between the piston 30 and the discharge port or nozzle 20 contains a quantity or body of suitable material for resisting rearward movement of the piston 30. The properties of the material are such that it yields to relatively high pressure from the piston by flowing out through the nozzle 20 and in doing so offers sufficiently high resistance to the movement of the piston to absorb the major portion of any excessive impact force directed against the piston.

In the particular practice of the invention exemplified in FIG. 2, the cylinder 16 contains for this purpose a body 31 of material that is normally solid in the sense of being solid at atmospheric pressure and ordinary outdoor temperatures but is nevertheless capable of yielding to high pressure by extrusion through the nozzle 20. The yield point of the body 31 with respect to responsiveness to pressure from the piston 30 is preferably within the range of pressures created by compression of the coiled spring 27 but is near the upper end of that range so that the spring acts along to absorb energy during the initial portion of an impact force transmitted to the plunger 15.

With the described relationships in effect, it can be seen how the energy-absorbing unit 12 reacts to an impact force in two stages with the spring 27 absorbing energy in the first stage of reaction and the piston 30 acting on the body 31 to absorb energy in the second stage. It can also be seen that with the yield point of the body 31 near the upper end of the range of pressures created by the spring 27 in the first stage of operation the piston 30 will begin to move as the spring 27 reaches full compression so that there is a smooth transition from the first stage of resistance by the spring 27 and the subsequent stage of operation in which the resistance to the impact force is created by extrusion of the body 31.

During the second stage of operation in which the piston 30, acting on the body 31 resists the inward movement of the plunger 15, the spring 27 may be compressed solid for transmitting pressure from the thrust member 25 to the piston 30. In the preferred practice of my invention, however, I provide the thrust member 25 with a suitable extension 32 to keep the spring 27 from being compressed solid and to serve as means to transmit thrust from the plunger 15 to the piston 30 independently of the spring 27 whenever the spring is compressed to nearly the end of its elastic limit. As shown in FIG. 2 the extension 32 may be a metal block of cylindrical configuration dimensioned to fit inside the spring 27.

A feature of the preferred practice of the invention is the concept of providing suitable means to prevent excessive recoil on the part of the spring 27. Preferably this end is achieved by an automatic latch that interconnects the thrust member 25 and the piston 30 whenever the spring 27 is compressed to a predetermined point near the upper end of its pressure range.

In the particular construction shown in FIG. 2, the end of the extension 32 has a large rectangular recess 33 to receive a pair of latch member or pawls 35 that are pivoted on pin 36 extending across the recess 33. Each latch member 35 has a tapered nose 37 together with an engagement shoulder 38. A suitable coiled spring 41 has its opposite ends hooked around the two latch members 35 and is wrapped around the cross pin 36 to continuously urge the two latch members 35 apart, this divergent action being limited by abutment of the two latch members against the surrounding wall of the recess 33. Thus the two latch members are normally in the positions shown in solid lines in FIG. 2.

For cooperation with the two latch members 35, the piston 30 is provided on its forward face with a large axial bore 45, the entrance to which is preferably rounded or beveled for smooth cam action against the tapered noses 37 of the two latch members. The inner end of the bore 45 is enlarged to provide an angular shoulder 46 for engagement by the shoulders 38 of the latch members 35. It is apparent that as the extension 32 of the thrust member 25 approaches the piston 30, the tapered noses 37 of the latch members 35 contact the entrance of the axial bore 45 of the piston and by cam action the two latch members 35 contract for passage into the bore 45. The contracted positions of the two latch members are shown by broken lines indicated at 47 in FIG. 2.

The operation of the impact-absorbing safety device shown in FIGS. 1 and 2 may be readily understood from the foregoing description. The initial portion of an impact force against the bumper 11 is absorbed by the springs 27 of the two energy-absorbing units 12 as the plungers 15 initially move inward to shift the thrust members 25 toward the pistons 30 in the two units 12.

Unless the impact force is of dangerously high magnitude, the rearward movement of each plunger 15 will not exceed the first stage of operation. In other words, the thrust member 25 of the two energy-absorbing units 12 will not be shifted sufficiently close to the corresponding pistons 30 to cause latching operation of the latch members 35, and each of the springs 27 remains free to recoil or expand to return the thrust members 25 to their normal forward positions in the cylinder 16. In this way the arrangement shown in FIG. 1 serves as an ordinary shock absorber or buffer means for cushioning the effect of relatively minor impact forces.

If an impact force against the bumper 11 is of dangerously excessive magnitude, each of the plungers 15 of the energy-absorbing units 12 will enter its second stage of operation in which the extension 32 of the thrust member 25 contacts the piston 30 to move the piston rearward against the resistance of the body 31. As the extension 32 of the thrust member 25 approaches the piston 30, the two latch members 35 contract to enter the piston bore 45 and then under the action of the coiled spring 41 expand to the latched positions shown in broken lines at 48 in FIG. 2. The impact force then performs work by causing the piston to extrude the material of the body 31 through the discharge nozzle 20, and such extrusion absorbs a major portion of the impact force.

Whenever a plunger 15 is forced inward sufficiently to cause the thrust member 25 to be latched to the corresponding piston 30, the energy-absorbing unit is rendered inoperative with respect to its first stage of operation; and when the piston 30 is moved a substantial distance to extrude the material of the body 31, the unit is also rendered inoperative with respect to its second stage of operation. In such an event it becomes necessary to release the latch members 35 from the piston 30 and to replenish the body 31 of extrustion material.

It is contemplated that the thrust member 25 may be unlatched from the piston 30 simply by driving the cross pin 36 endwise to release the two latch members 35, the cross pin being removably mounted for this purpose in a diametrical bore that extends all the way through the extension 32 of the thrust member.

It will be apparent to those skilled in the art that various materials may be used for the body 31 that is acted upon by the piston 30 for extrusion through the nozzle 20. For example, lead or type metal may be employed, or a suitable plastic such as suitably plasticized cellulose acetate butyrate, ethyl cellulose, or polyvinyl chloride acetate. Other suitably plasticized compounds may be employed, or a rubber-like elastomer such as butyl rubber.

The yield point in terms of piston pressure for a particular selected extrusion material will depend not only on the properties of the material but also on the diameter of the piston and the size and configuration of the discharge nozzle 20. Thus the smaller the diameter of the piston, the less thrust required to move the piston against the confined material for extrusion of the material, and on the other hand, the smaller the discharge nozzle, the greater the force required for extrusion. With these factors in mind it is a simple matter for a person skilled in the art to select an extrusion material for the invention and to design the springs and cylinder to carry out the desired function of absorbing an impact force by the described two-stage operation with a smooth transition from the first stage to the second stage.

In the second form of the invention exemplified by FIG. 3, an energy-absorbing unit, generally designated 50, replaces each of the previously described energy-absorbing units 12. Each of the modified units 50 is of the same general construction as heretofore described including a plunger 55 that extends through a bushing 56 into a pressure cylinder 57. The inner end 58 of the plunger 55 is threaded into a thrust member 60 in the manner heretofore described, but in this construction the thrust member has a heavy end wall 61 from which extends a cylinderical wall 62 and an axial extension 63, the cylindrical wall and axial extension being preferably integral with the end wall 61. The cylindrical wall 62 and the axial extension 63 form an annular space to receive the forward end of a helical spring 65 that corresponds to and functions in the same manner as the previously described spring 27.

The rear end of the helical spring 65 presses against a piston 66 that is similar to the previously described piston and has a similar axial bore 67 leading to an annular latching or engagement shoulder 68. The previously described latch members 35 are each mounted in the usual manner on a cross pin 70, these two members being mounted across a rectangular recess 72 in the end of the axial extension 63 of the thrust member 60.

In this modified form of the invention, it is contemplated that the piston 66 will act upon a body 75 of suitable material in a sealed container 76, the container being adapted to open automatically for release of the material in response to a high pressure from the piston 66. The container 76, for example, may have a thin wall which compresses to rupture in response to the high pressure from piston 66, and to facilitate such rupturing of the container, the nozzle 77 of the cylinder 57 may be provided with a bushing 78 having an inwardly directed point 80. The point 80 is positioned to puncture the container 76 when the container is expanded towards the bushing by pressure from the piston 66.

Preferably, the piston 66 is normally anchored against movement by suitable frangible means such as a pair of pins 81 that extends through bores 82 in the wall of the cylinder 57 into corresponding blind bores 83 in the piston. The material and dimensions of the frangible pins 81 will be such that the pins will yield when the spring 65 is compressed to the point at which initial movement of the piston is desired.

The material of the body 75 in the container 76 may be normally solid if desired, but the use of a sealed container makes it practical to employ a semi-liquid material such as a suitable wax or resin solution or to employ a suitable liquid material or substance such as glycerin for dashpot action.

The operation of this second form of the invention is similar to that of the first form. If an impact force is of dangerously excessive magnitude, the spring or yielding means 65 will be compressed during the initial portion of the impact force and then will be latched against recoil as the thrust member or forcing means 60 moves against the piston or wall 66 to break the retaining pins 81 to initiate the second stage of operation. In this second stage the piston 66 moving against the container 75 within the cylinder or holder 57 causes the container to move towards the nozzle or port 77 so that the container is ruptured by the point 80 of the bushing 78. The material of the body 75 is released for discharge through the nozzle to absorb energy by a dashpot action.

It will thus be seen in accordance with my invention I have provided an arrangement which utilizes means and method steps for absorbing kinetic energy of a moving mass by first absorbing an initial part of the kinetic energy in accordance with Hooke's law, that is, in which the restoring force is proportional to the displacement, up to the point where the restoring force reaches the yield point of the plastic material, and another portion of the kinetic energy is absorbed in accordance with the laws of plastic flow by overcoming the yield point of the plastic material and extruding it out an orifice. Also, as pointed out above, preferably the means used to provide the absorption of energy in accordance with Hooke's law, when reaching the yield point of the plastic material, is locked in position or otherwise prevented from rebounding so that the absorbing system absorbs the kinetic energy without any kick-back or rebound. The proportion of the kinetic energy absorbed in accordance with Hooke's law, that is, by the spring, for example, in which the restoring force is proportional to the displacement will be preferably sufficient to avoid the usual shock resulting from an impact of a moving mass and the rest of the kinetic energy will be absorbed by plastic extrusion as described above to let the mass slow down easily. Usually in accordance with my method and device a sufficient quantity of plastic will be supplied in the device to enable it, taking into consideration the kinetic energy absorbed by the spring to absorb all the kinetic energy that it is expected will have to be absorbed to bring the moving mass to the desired velocity, including zero, that is, to a stop.

This application is a division of application Serial No. 617,648, filed October 22, 1956, and of Serial No. 228,847, filed May 29, 1951 (both now abandoned).

It will be understood that the specific embodiments of my invention described above are intended to illustrate and exemplify my invention and are not necessarily intended as a limitation thereon and that modifications of my invention may be made within the scope of the following claims which define the invention sought to be covered by Letters Patent.

I claim:
1. A shock-absorbing device to be mounted in impact-receiving position between an obstacle and a vehicle, said device comprising a holder having a discharge port, a container containing a liquid fluid material within said holder, said fluid being flowable through said port on impact of sufficient force to rupture said container, and means movable within said holder for receiving the impact and transmitting the force thereof to said container to compress to rupture said container and cause said fluid to flow through said discharge port, thereby absorbing kinetic energy of impact.

2. A shock-absorbing device to be mounted in impact-receiving position between an object and a vehicle, said device comprising a holder having a discharge port, a sealed container containing a liquid fluid material within said holder adjacent said discharge port, means adjacent said discharge port for puncturing said sealed container, and means movable within said holder for receiving the impact and transmitting the force thereof to said container to cause said container to compress to rupture and said fluid material to flow through said discharge port, thereby absorbing kinetic energy of impact.

3. A shock-absorbing device to be mounted in impact-receiving position between an object and a vehicle, said device comprising a cylinder having a discharge port at one end thereof, a sealed container containing a liquid fluid material within said cylinder adjacent said discharge port, a wall movable within said cylinder toward said discharge port and said container for receiving the impact and transmitting the force thereof to said container to compress to rupture said container and cause said fluid material to flow through said discharge port, thereby absorbing kinetic energy of impact.

4. A shock-absorbing device as defined in claim 3 which includes frangible means within said cylinder to hold said wall stationary against a force of impact and to release the wall for movement in response to a greater force of impact.

5. A shock absorbing device to be mounted in impact receiving position between an object and a vehicle, said device comprising a holder having a discharge port at one end thereof, a wall movable within said holder toward said discharge port, a sealed container containing a liquid fluid substance within said holder between said wall and said discharge port, forcing means for movement toward and against said movable wall in response to impact force, and yielding means engaging said forcing means to resist movement of said forcing means toward said movable wall, said yielding means receiving the impact and absorbing a part of the kinetic energy of impact and transmitting the remaining force of said impact to said movable wall and to said container to compress to rupture said container and cause said fluid material to flow through said discharge port, thereby absorbing the remaining kinetic energy of impact.

6. A shock-absorbing device as defined in claim 5, which includes frangible means within said holder to hold said wall stationary against a force of impact and to release the wall for movement in response to a greater force of impact.

References Cited in the file of this patent
UNITED STATES PATENTS

| | | |
|---|---|---|
| 575,748 | Williamson | Jan. 26, 1897 |
| 874,150 | Young | Dec. 17, 1907 |
| 1,702,675 | Ventura | Feb. 19, 1929 |
| 1,765,200 | Bullough | June 17, 1930 |
| 1,799,894 | Fritsch | Apr. 7, 1931 |

(Other references on following page)

UNITED STATES PATENTS

| | | |
|---|---|---|
| 1,811,152 | Procotieff-Seversky | June 23, 1931 |
| 1,925,461 | Ridge | Sept. 5, 1933 |
| 2,029,789 | Parks | Feb. 4, 1936 |
| 2,144,357 | Booharin | Jan. 17, 1939 |
| 2,208,076 | Jones | July 16, 1940 |
| 2,251,347 | Williams et al. | Aug. 5, 1941 |
| 2,367,977 | Thornhill | Jan. 23, 1945 |
| 2,466,265 | Noonan | Apr. 5, 1949 |
| 2,553,237 | Camarero | May 15, 1951 |
| 2,557,105 | Hight | June 19, 1951 |
| 2,562,595 | Blue | July 31, 1951 |
| 2,570,853 | Pierce | Oct. 9, 1951 |
| 2,615,373 | Pegard | Oct. 28, 1952 |
| 2,732,040 | De Vost et al. | Jan. 24, 1956 |
| 2,811,385 | Butler | Oct. 29, 1957 |
| 2,837,176 | Dropkin | June 3, 1958 |
| 2,857,889 | Stott | Oct. 28, 1958 |

FOREIGN PATENTS

| | | |
|---|---|---|
| 655,030 | Great Britain | July 4, 1951 |